United States Patent
Idemura

(10) Patent No.: US 6,788,888 B1
(45) Date of Patent: Sep. 7, 2004

(54) OPTICAL DEVICE AND IMAGE SENSING SYSTEM

(75) Inventor: Takeshi Idemura, Utsunomiya (JP)

(73) Assignee: Canon Kabushiki Kaisha, Tokyo (JP)

(*) Notice: Subject to any disclaimer, the term of this patent is extended or adjusted under 35 U.S.C. 154(b) by 777 days.

(21) Appl. No.: 09/626,230

(22) Filed: Jul. 26, 2000

(30) Foreign Application Priority Data

Jul. 30, 1999 (JP) .......................................... 11-217984

(51) Int. Cl.$^7$ ............................................. G03B 17/00
(52) U.S. Cl. ........................ 396/85; 396/131; 396/137; 348/240.3
(58) Field of Search .......................... 396/85, 131, 137; 348/240.3

(56) References Cited

U.S. PATENT DOCUMENTS 5,041,855 A  8/1991  Takezawa et al. ........ 354/195.1
5,227,829 A  7/1993  Imanari et al.
5,572,373 A * 11/1996  Imanari et al. ............. 359/825

FOREIGN PATENT DOCUMENTS

EP  0 848 271 A1  6/1998

* cited by examiner

Primary Examiner—David M. Gray
(74) Attorney, Agent, or Firm—Morgan & Finnegan, LLP

(57) ABSTRACT

An optical device has an optical member that includes the optical device, an operating ring which can be rotated about the optical axis of the optical member and is used to drive the optical member, a switching mechanism which transmits the drive force from a motor drive source to the operating ring, and can be switched between a state for motor-driving the optical member and a state for canceling motor driving of the optical member, and control means for switching the switching mechanism between the motor-driving state and the motor-driving canceling state, and the control means switches the switching mechanism to the state for canceling motor driving on the basis of manual operation of the operating ring when the switching mechanism is motor-driving the optical member.

18 Claims, 3 Drawing Sheets

OPTICAL DEVICE AND IMAGE SENSING SYSTEM

BACKGROUND OF THE INVENTION

1. Field of the Invention

The present invention relates to an optical device such as a lens device or the like used in television image sensing, and an image sensing system using the optical device.

2. Related Background Art

As a lens device used in television image sensing or the like, a device shown in FIGS. 3 and 4 is known. In this lens device, a movable lens group (not shown) held in a housing 39 can be moved by rotating an operating ring 31 provided to the outer circumferential surface of a device main body 30 manually or by a motor, or a stop (not shown) can be adjusted.

A drive unit 32 provided near the housing 39 houses a motor 35 for motor-driving the operating ring 31, a control circuit (not shown), and the like, and a motor operating switch 33, which is operated by the user to operate the motor 35 to drive the movable lens group is provided on the outer surface of the drive unit 32.

This lens device has a clutch mechanism for connecting/disconnecting a driving power transmission path for transmitting the drive force of the motor 35 to the operating ring 31, as shown in FIG. 4.

More specifically, the clutch mechanism is made up of an idler gear 37 provided between an operating gear portion 34 formed on the operating gear 31 and an output gear 36 of the motor 35, and a clutch operating lever (not shown) which slides the idler gear 37 in the axial direction (longitudinal direction) of an idler shaft 38.

Upon motor driving, the clutch operating lever is operated to shift the idler gear 37 to mesh with both the operating gear portion 34 and output gear 36, thus connecting the drive force transmission path. Upon manual driving, the clutch operating lever is switched to shift the idler gear 37 to disengage from the output gear 36, thus disconnecting the drive force transmission path.

However, in the aforementioned lens device, the clutch operating lever must be operated to select the manual or motor driving mode of the operating ring. For this reason, operation is troublesome, and the manual and motor driving modes cannot be quickly switched, thus often failing to catch up with changes in image sensing situation.

Even when the drive force transmission path is connected, and while the movable lens group is motor-driven, the operating ring can be manually driven in terms of a structure. However, since a very large operating force is required due to the motor load, operation is not easy, and the motor is overloaded. Furthermore, when the movable lens group or the like is motor-driven via a camera control unit (CCU) placed at a position separated from this lens device and a camera to which that lens device is mounted, it is difficult for a person taking photographs who is near the camera to manually operate the operating ring preferentially.

It is, therefore, an object of the present invention to provide an optical device which is adopted quickly switch the motor-driven/manual state of a drive mechanism for driving a movable portion without requiring any special operation so as to avoid a problem such as overload of a motor when the movable portion is manually operated while the drive mechanism is set in the motor-driven state.

SUMMARY OF THE INVENTION

An aspect of the first invention of the present application that achieves the above object is characterized in that an optical device comprises:

an optical member that comprises the optical device;

an operating ring which can be rotated about an optical axis of the optical member and is used to drive the optical member;

a switching mechanism which transmits a drive force from a motor drive source to the operating ring, and can be switched between a state for motor-driving the optical member and a state for canceling motor driving of the optical member; and control means for switching the switching mechanism between the state for motor-driving the optical member and the state for canceling motor driving of the optical member, and the control means switches the switching mechanism to the state for canceling motor driving of the optical member on the basis of manual operation of the operating ring when the switching mechanism is set in the state for motor-driving the optical member.

In a preferred aspect, the control means detects manual operation of the operating ring on the basis of a load state of the motor drive source.

In a preferred aspect, the control means detects manual operation of the operating ring on the basis of a drive current value of the motor drive source.

In a preferred aspect, the control means detects manual operation of the operating ring on the basis of a counter-electromotive force produced in the motor drive source.

In a preferred aspect, the control means detects manual operation of the operating ring on the basis of a difference between a drive state of the optical member corresponding to a drive command, and an actually driven state of the optical member.

In a preferred aspect, the drive command is to command a drive position of the optical member, and the control means detects manual operation of the operating ring on the basis of a difference between the drive position command of the optical member, and an actually driven position.

In a preferred aspect, the drive command is to command a drive velocity of the optical member, and the control means detects manual operation of the operating ring on the basis of a difference between the drive velocity command of the optical member, and an actually driven velocity.

In a preferred aspect, the switching mechanism has a clutch mechanism for connecting/disconnecting drive force transmission between the operating ring and the motor drive source, and the control means switches the switching mechanism from the state for motor-driving the optical member to the state for canceling motor driving by switching the clutch mechanism from a connected state to a disconnected state.

In a preferred aspect, the optical member is a lens having a zoom function.

In a preferred aspect, the drive command of the optical member is input from operation means operated by a user.

In a preferred aspect, the drive command of the optical member is input from a control unit located at a position separated from the optical device.

In a preferred aspect, the drive command of the optical member is input from an image sensing device which is mounted on the optical device to be able to communicate therewith, and senses an image.

In a preferred aspect, the switching mechanism is driven by the motor drive source which operates in accordance with operation of motor operation means.

A second aspect of the invention of the present application that achieves the above object is characterized in that an image sensing system comprises:

an optical member that comprises an optical device;

an operating ring which can be rotated about an optical axis of the optical member and is used to drive the optical member;

a switching mechanism which transmits a drive force from a motor drive source to the operating ring, and can be switched between a state for motor-driving the optical member and a state for canceling motor driving of the optical member;

control means for switching the switching mechanism between the state for motor-driving the optical member and the state for canceling motor driving of the optical member; and an image sensing device which is mounted on the optical device to be able to communicate therewith, and senses an image, and the control means switches the switching mechanism to the state for canceling motor driving of the optical member on the basis of manual operation of the operating ring when the switching mechanism is set in the state for motor-driving the optical member.

In a preferred aspect, the control means detects manual operation of the operating ring on the basis of a load state of the motor drive source.

In a preferred aspect, the control means detects manual operation of the operating ring on the basis of a counter-electromotive force produced in the motor drive source.

In a preferred aspect, the control means detects manual operation of the operating ring on the basis of a difference between a drive state of the optical member corresponding to a drive command, and an actually driven state of the optical member.

In a preferred aspect, the switching mechanism has a clutch mechanism for connecting/disconnecting drive force transmission between the operating ring and the motor drive source, and the control means switches the switching mechanism from the state for motor-driving the optical member to the state for canceling motor driving by switching the clutch mechanism from a connected state to a disconnected state.

DETAILED DESCRIPTION OF THE PREFERRED EMBODIMENTS

Figure 1:
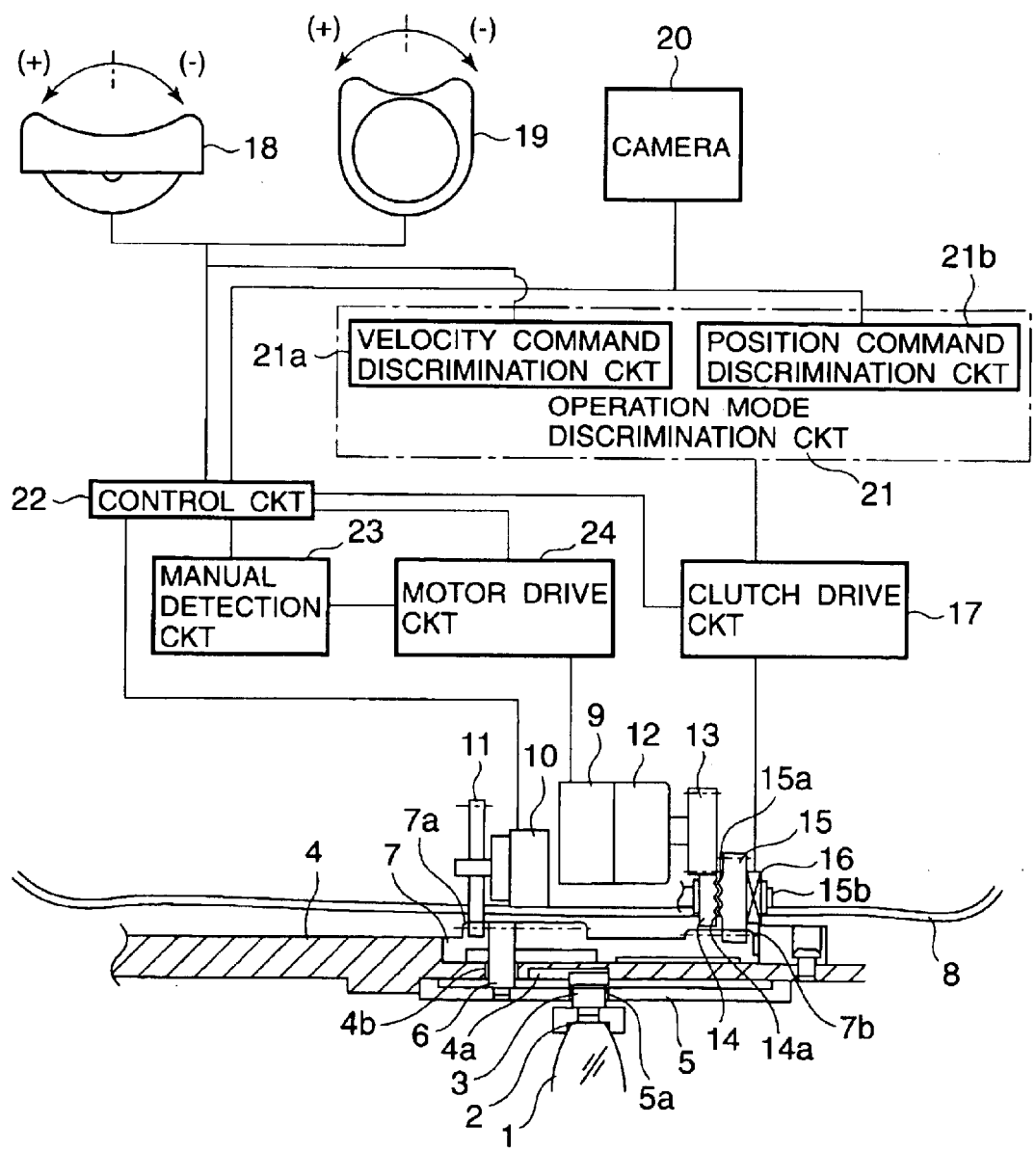
FIG. 1 is a schematic view showing a lens drive mechanism of a zoom lens device according to an embodiment of the present invention.

FIG. 1 shows the arrangement of a zoom lens device (optical device) according to an embodiment of the present invention. This zoom lens device is used in, e.g., television image sensing or the like.

Referring to FIG. 1, a zoom lens 1 is held by a zoom lens barrel 2, and is movable in its optical axis direction (the right-and-left direction in FIG. 1). The zoom lens barrel 2 has at least three roller members 3 which project radially outwardly, and each roller member 3 engages with a straight groove 4a formed in a stationary cylinder 4 as a housing and a curved groove 5a formed in a rotary cylinder 5.

The rotary cylinder 5 has a coupling pin 6 which projects radially outwardly and engages with a zoom operating ring 7 via a groove 4b formed in the stationary cylinder 4.

In such arrangement, when the zoom operating ring 7 is rotated, the rotary cylinder 5 rotates together with the zoom operating ring 7, and the roller members 3 provided to the zoom lens barrel 2 move along the straight groove 4a of the stationary cylinder 4 and the curved groove 5a of the rotary cylinder 5. In this manner, the zoom lens 1 moves in its optical axis direction in the stationary cylinder 4. Note that the operating ends of the zoom operating ring 7 and zoom lens 1 are determined by the operating range of the coupling pin 6 which rotates about the optical axis via a groove 4b of the stationary cylinder 4.

A drive unit 8 is laid out near the stationary cylinder 4, and houses a control circuit (main control means) 22, a zoom motor (motor driving source) 9, a potentiometer 10 for detecting the zoomlens position, drive circuits 17 and 24, an operation mode discrimination circuit 21, and the like.

A position detection gear 11 that meshes with an operating gear portion 7a formed on the zoom operating ring 7 is attached to the input shaft of the potentiometer 10. For this reason, upon rotation of the zoom operating ring 7, the input rotation of the potentiometer 10 is obtained in correspondence with the rotation amount of the ring 7, and the position of the zoom lens 1 can be detected based on the detection signal from the potentiometer 10. Note that the position detection via the potentiometer 10 allows to decelerate the zoom lens 1 near its operating end so as to relax impact force or noise caused when the zoom lens 1 (zoom lens barrel 2) contacts its operating end upon motor driving of the zoom lens 1.

The drive force of a zoom motor 9 is transmitted to an intermediate gear 14 via a gear head 12 and motor output gear 13. A face gear portion 14a is formed on the end face of the intermediate gear 14, and a face gear portion 15a of a coupling gear 15 is located to oppose that face gear portion 14a. The coupling gear 15 meshes with an operating gear 7b provided on the zoom operating ring 7. Driving of the zoom motor 9 is controlled by the motor drive circuit 24 that receives a position control signal from the control circuit 22.

An electromagnetic clutch 16 is attached to a support shaft 15b of the coupling gear 15 at a position opposite to the intermediate gear 14. By ON/OFF-controlling this electromagnetic clutch 16, the coupling gear 15 slides in the axial direction (longitudinal direction) of the support shaft 15b, and can switch engagement/disengagement between the face gear portions 14a and 15a of the intermediate gear 14 and coupling gear 15.

Since the coupling gear 15 meshes with the operating gear portion 7b of the operating ring 7, when the electromagnetic clutch 16 is controlled to be turned on, the intermediate gear 14 and coupling gear 15 can engage and rotate together, and the drive force of the zoom motor 9 can be transmitted to the zoom operating ring 7 to rotate it. In this manner, the zoom lens 1 (zoom lens barrel 2) is motor-driven in its optical axis direction. In the description of this embodiment, the state of the drive mechanism for motor-driving the zoom lens 1 in such way will be referred to as a motor zoom mode. As will be described later, the operating ring 7 can be manually rotated even in this motor zoom mode.

When the electromagnetic clutch 16 is controlled to be turned off, the intermediate gear 14 and coupling gear 15 disengage so as not to transmit the drive force of the zoom motor 9 to the zoom operating ring 7. In this case, when the user manually rotates the zoom operating ring 7, he or she can smoothly manually drive the zoom lens 1 without experiencing any load of the zoom motor 9. In the description of this embodiment, the state of the drive mechanism for manually driving the zoom lens 1 will be referred to as a manual zoom mode.

The electromagnetic clutch 16 is ON/OFF-controlled by the clutch drive circuit 17 that receives a signal from the control circuit 22.

Note that marks indicating positions of the zoom lens 1 are graduated on the operating ring 7, and the zoom position can be externally visually confirmed without any complicated structure.

Figure 2:
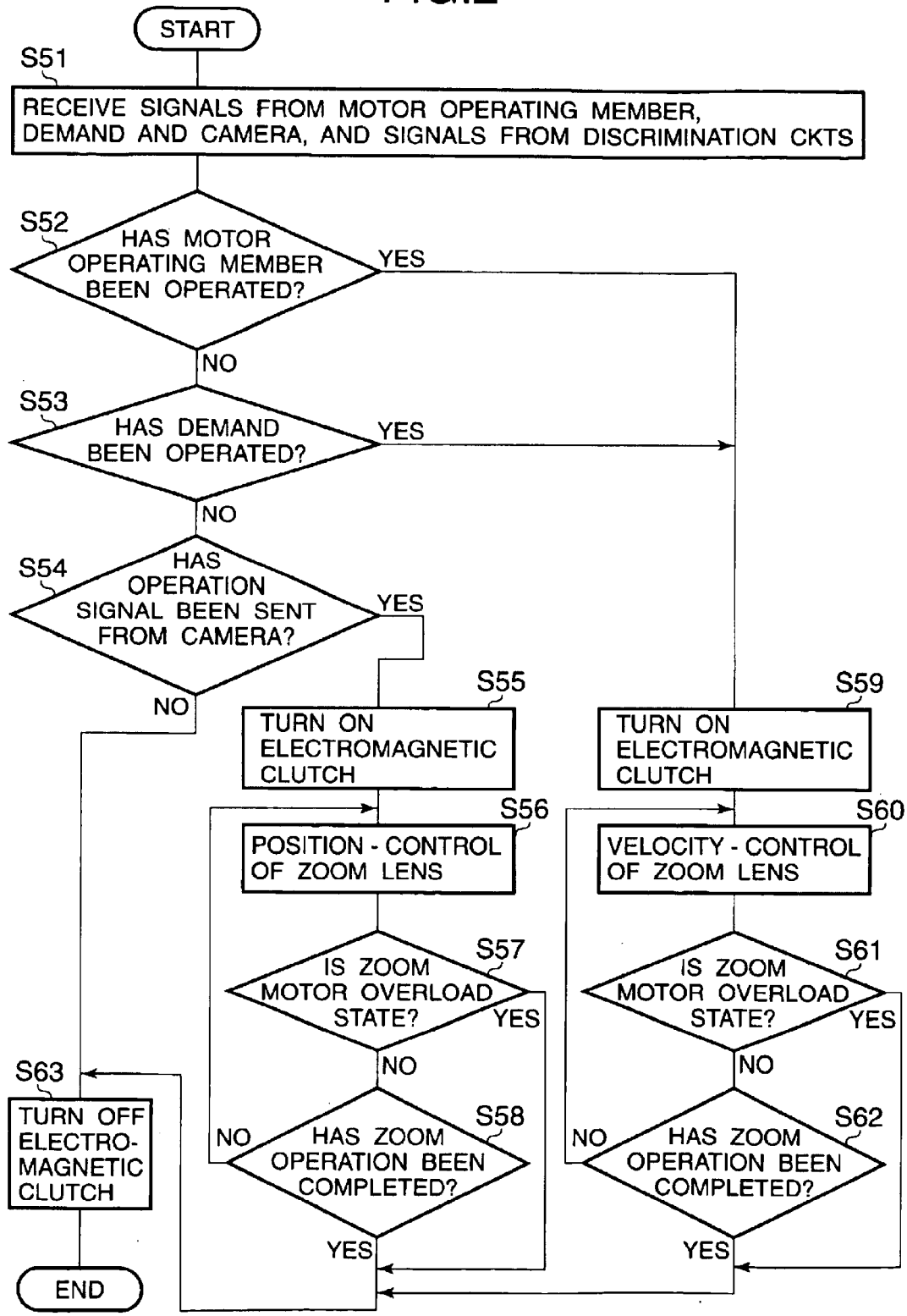
FIG. 2 is an operation flow chart of a control circuit of the zoom lens device.
Figure 3:
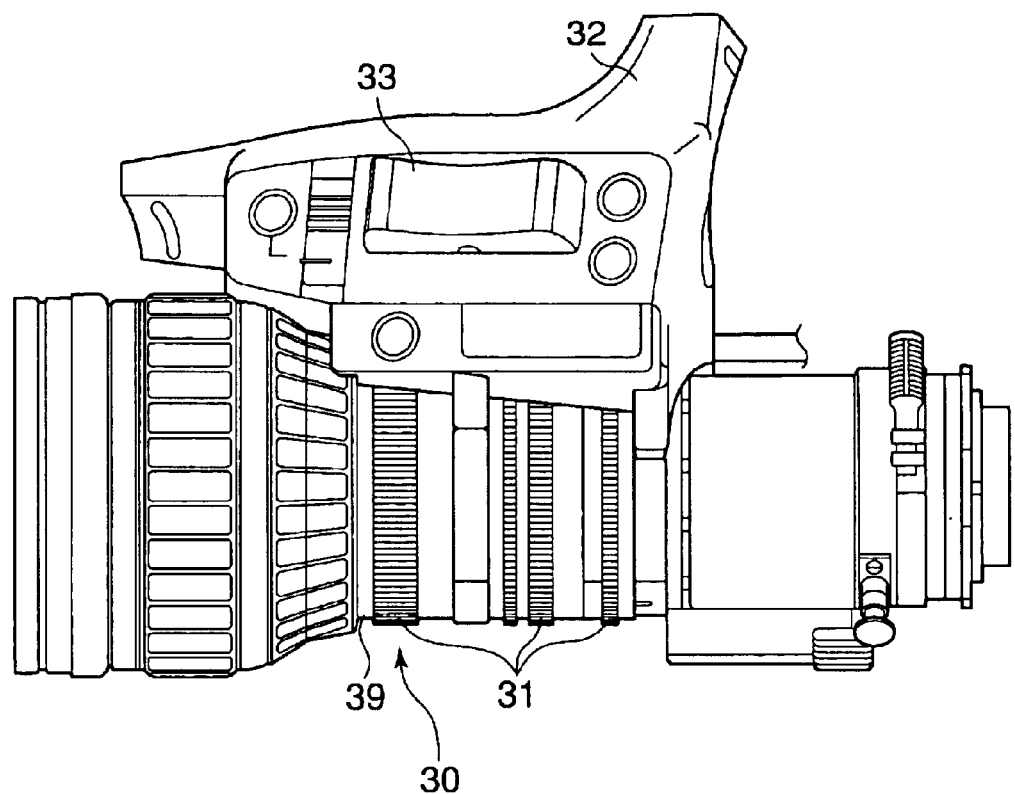
FIG. 3 is view showing the outer appearance of a conventional lens device.
Figure 4:
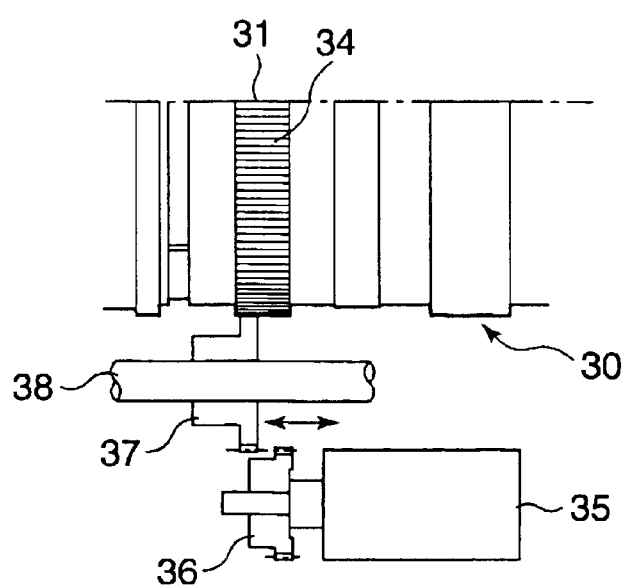
FIG. 4 is an explanatory view of mode switching of a drive mechanism in the conventional lens device.

Mode setups of the drive mechanism for driving the zoom lens 1 will be explained below with reference to the flow chart shown in FIG. 2.

The manual zoom mode and motor zoom mode can be switched by ON/OFF-controlling the electromagnetic clutch 16. One of these modes to be set is determined on the basis of command signals input from a zoom operating member 18 provided on the outer surface of the drive unit 8 to start motor driving, a zoom demand 19 provided to a tripod that supports this lens device and a camera device 20, a camera control unit (CCU) used to operate this lens device from a remote place, and the camera device 20 controlled by this CCU.

The lens device receives a velocity command signal from the zoom motor operating member 18 and zoom demand 19, and a position command signal from the camera control unit (CCU) and camera device 20.

These command signals are sent to the control circuit 22 and also to the operation mode discrimination circuit 21. Furthermore, the velocity command signal is sent to a velocity command discrimination circuit 21a, and the position command signal is sent to a position command discrimination circuit 21b.

The zoom motor operating member 18 and zoom demand 19 output a reference signal when they are not operated, and inputs a signal value, which shifts from the reference signal in accordance with the operation amount, to the control circuit 22 and the velocity command discrimination circuit 21a in the lens device, when they are operated.

The velocity command discrimination circuit 21a sends a signal to the control circuit 22 to set the drive mechanism in the manual zoom mode when the zoom motor operating member 18 and zoom demand 19 output a signal near the reference signal. The control circuit 22, which has received this signal in step (abbreviated as S in FIG. 2) 51, determines in step 52 or 53 that the zoom motor operating member 18 and zoom demand 19 are not operated, and the flow advances to step 54.

When a signal other than that near the reference signal is output, the velocity command discrimination circuit 21 sends a signal to the control circuit 22 to set the drive mechanism in the motor zoom mode. The control circuit 22, which has received this signal in step 51, determines in step 52 or 53 that the zoom motor operating member 18 or zoom demand 19 has been operated, and the flow advances to step 59. In step 59, the control circuit 22 sends a signal to the clutch drive circuit 17 to turn on the electromagnetic clutch 16.

Upon receiving a position command signal from the camera device 20 or the like, the position command discrimination circuit 21b sends a signal to the control circuit 22 to set the drive mechanism in the manual zoom mode, when the signal value of the received signal does not change within a predetermined period of time. The control circuit 22, which has received this signal in step 51, determines in step 54 via steps 52 and 53 that no position command signal (operation signal) is input from the camera device 20 or the like, and the flow advances to step 63. In step 63, the control circuit 22 sends a signal to the clutch drive circuit 17 to turn off the electromagnetic clutch 16.

On the other hand, when the signal value has changed within a predetermined period of time, the position command discrimination circuit 21b sends a signal to the control circuit 22 to set the drive mechanism in the motor zoom mode. The control circuit 22, which has received this signal in step 51, determines in step 54 via steps 52 and 53 that the position command signal (operation signal) has been input from the camera device 20 or the like, and the flow advances to step 55. In step 55, the control circuit 22 sends a signal to the clutch drive circuit 17 to turn on the electromagnetic clutch 16.

The control circuit 22 which has executed step 55 or 59 then executes step 56 or 60, and sends a signal to the motor drive circuit 24 to control driving of the zoom motor 9 on the basis of the command signal received in step 51, until this drive control is completed (step 58 or 62).

As described above, in this embodiment, since the mode of the drive mechanism of the zoom lens 1 is switched on the basis of the input command signal, mode switching of the drive mechanism can be quickly attained without requiring any special operation of, e.g., a mode switching lever or the like unlike in the prior art.

The operations when the drive mechanism of the zoom lens 1 is set in the motor zoom mode, and when the user manually operates the operating ring 7 during motor driving of the zoom lens 1 will be explained with reference to the flow chart in FIG. 2.

In this embodiment, when the user manually operates the operating ring 7 during motor driving of the zoom lens 1, this manual operation overrides motor driving, and the electromagnetic clutch 16 is turned off, thus switching the zoom mode from the motor zoom mode to the manual zoom mode.

In order to detect manual operation of the operating ring 7 during motor driving of the zoom lens 1, in this embodiment, a manual detection circuit 23 detects a change in drive current value supplied from the motor drive circuit 24 that drives the zoom motor 9 to the zoom motor 9.

More specifically, the manual detection circuit 23 samples the drive current value from the motor drive circuit 24 at given time intervals, and determines that manual operation has been done during motor driving of the zoom lens 1 when the variation width between a current value sampled initially or a predetermined time before, and the currently sampled current value is equal to or larger than a predetermined value (i.e., when the zoom motor 9 is overloaded). In such state, the circuit 23 sends a signal to the control circuit 22.

In this manner, the control circuit 22 determines based on the signal from the manual detection circuit 23 in step 57 or 61 that the zoom motor 9 has been overloaded (the operating ring 7 has been manually operated) during motor driving of the zoom lens 1 in which a routine in steps 56 to 58 or steps 60 to 62 repeats itself, and the flow jumps to step 63 to turn off the electromagnetic clutch 16. In this manner, when the manual operation force acts on the zoom lens 1 during motor driving of the zoom lens 1, the zoom mode is automatically switched from the motor zoom mode to the manual zoom mode.

As another manual operation detection means, a change in counterelectromotive force produced in the zoom motor 9 may be detected, and it may be determined that manual operation has been done during motor driving of the zoom lens 1, when the variation width between a counterelectromotive force sampled initially or a predetermined time before, and the currently sampled counterelectromotive force is equal to or larger than a predetermined value.

Furthermore, the position data of the zoom lens 1 may be detected using the potentiometer 10, the difference between this detection result and the zoom position corresponding to the position command signal may be computed upon every sampling, and it may be determined that manual operation has been done during motor driving of the zoom lens 1, when the difference has abruptly changed.

Moreover, velocity data may be computed by differentiating the position data detected by the potentiometer, the difference between the computed velocity data and the drive velocity corresponding to the velocity command signal may be computed at every sampling, and it may be determined that manual operation has been done during motor driving of the zoom lens 1, when the difference has abruptly changed.

As described above, according to this embodiment, not only the zoom mode can be switched between the manual zoom mode and motor zoom mode without requiring any special mode switching operation, but also manual operation during motor driving of the zoom lens 1 can be detected without adding any sensor member, and the motor zoom mode can be switched to the manual zoom mode. For this reason, when the user makes manual operation during motor driving of the zoom lens 1, manual operation with an appropriate operation force can override motor driving.

In the above description, when the operating ring 7 has been manually operated during motor driving of the zoom lens 1, the drive mechanism is switched from the motor zoom mode to the manual zoom mode. Also, when manual operation has been done while the drive mechanism is set in the motor zoom mode but the zoom lens 1 is not motor-driven (the zoom lens 1 stands still), manual operation may be detected by detecting, e.g., the counterelectromotive force produced in the zoom motor 9, and the drive mechanism may be switched from the motor zoom mode to the manual zoom mode.

In this manner, manual operation of the zoom lens 1 can be quickly and smoothly started without requiring any special user operation for switching the mode of the drive mechanism.

In this embodiment, the manual zoom mode and motor zoom mode are switched using the electromagnetic clutch 16. In place of the electromagnetic clutch, some other means such as a solenoid or the like that can connect/disconnect the drive force transmission path using a motor can be used.

In this embodiment, the zoom motor operating member 18 and zoom demand 19 have been explained as velocity command source, and the camera device 20 and CCU have been explained as position command sources. However, the commands they issue are not limited to the velocity or position command.

Furthermore, the "movable portion" in the present invention can be any of those that form an optical system, such as a focusing lens, zoom lens, iris (stop), macro, filter disk, and the like.

As described above, according to the first embodiment, when the operating ring has been manually operated while the drive mechanism is set in a state for motor driving of the movable portion, the drive mechanism is automatically switched to a state for canceling motor driving of the movable portion. Hence, the drive mechanism can be quickly switched to the state for canceling motor driving without requiring any special user operation for switching the state of the drive mechanism. In addition, the manual operation force can be prevented from increasing due to the load of the motor driving source, thus allowing smooth manual operation.

On the other hand, when the operating ring has been manually operated while the drive mechanism is set in the state for motor-driving the movable portion and the movable portion is being motor-driven, since the drive mechanism is automatically switched to the state for canceling motor driving of the movable portion, manual operation can be easily done at an appropriate operation force even during motor driving of the movable portion. Hence, even when motor drive control is made from a remote position, e.g., by the CCU or the like, manual operation done by a person taking photographs near the camera can override motor drive control.

With these inventions, an optical device and image sensing system which can obtain high operability in various image sensing situations can be realized.

What is claimed is:

1. An optical device comprising:

an optical member;

an operating ring which can be rotated about an optical axis of said optical member and is capable of driving said optical member;

a switching mechanism which can transmit a drive force from a motor drive source to said operating ring, and can be switched between a state for motor-driving said optical member and a state for canceling motor driving of said optical member; and control means capable of switching said switching mechanism between the state for motor-driving said optical member and the state for canceling motor driving of said optical member, wherein said control means is configured to switch said switching mechanism to the state for canceling motor driving of said optical member on the basis of manual operation of said operating ring when said switching mechanism is set in the state for motor-driving said optical member by detecting a signal of the motor drive source.

2. A device according to claim 1, wherein said control means detects manual operation of said operating ring on the basis of a load state of the motor drive source.

3. A device according to claim 2, wherein said control means detects manual operation of said operating ring on the basis of a drive current value of the motor drive source.

4. A device according to claim 1, wherein said control means detects manual operation of said operating ring on the basis of a counterelectromotive force produced in the motor drive source.

5. A device according to claim 1, wherein said switching mechanism has a clutch mechanism for connecting/disconnecting drive force transmission between said operating ring and the motor drive source, and said control means switches said switching mechanism from the state for motor-driving said optical member to the state for canceling motor driving by switching said clutch mechanism from a connected state to a disconnected state.

6. A device according to claim 1, wherein said optical member is a lens having a zoom function.

7. A device according to claim 1, wherein said switching mechanism is driven by the motor drive source which operates in accordance with operation of motor operation means.

8. An image sensing system comprising:

an optical member;

an operating ring which can be rotated about an optical axis of said optical member and is capable of driving said optical member;

a switching mechanism which can transmit a drive force from a motor drive source to said operating ring, and can be switched between a state for motor-driving said optical member and a state for canceling motor driving of said optical member;

control means capable of switching said switching mechanism between the state for motor-driving said optical member and the state for canceling motor driving of said optical member; and an image sensing device which is mounted on the optical device to be able to communicate therewith, and senses an image;

wherein said control means is configured to switch said switching mechanism to the state for canceling motor driving of said optical member on the basis of manual operation of said operating ring when said switching mechanism is set in the state for motor-driving said optical member by detecting a signal of the motor drive source.

9. A system according to claim 8, wherein said control means detects manual operation of said operating ring on the basis of a load state of the motor drive source.

10. A system according to claim 8, wherein said control means detects manual operation of said operating ring on the basis of a counterelectromotive force produced in the motor drive source.

11. A system according to claim 8, wherein said switching mechanism has a clutch mechanism for connecting/disconnecting drive force transmission between said operating ring and the motor-drive source, and said control means switches said switching mechanism from the state for motor-driving said optical member to the state for canceling motor driving by switching said clutch mechanism from a connected state to a disconnected state.

12. An optical device comprising:

an optical member;

an operating ring which can be rotated about an optical axis of said optical member and is capable of driving said optical member;

a switching mechanism which can transmit a drive force from a motor drive source to said operating ring, and can be switched between a state for motor-driving said optical member and a state for canceling motor driving of said optical member; and control means capable of switching said switching mechanism between the state for motor-driving said optical member and the state for canceling motor driving of said optical member, said control means configured to switch said switching mechanism to the state for canceling motor driving of said optical member on the basis of manual operation of said operating ring when said switching mechanism is set in the state for motor-driving said optical member by detecting a difference between a drive state of said optical member corresponding to a drive command, and an actually driven state of said optical member.

13. A device according to claim 12, wherein the drive command is to command a drive position of said optical member, and said control means detects manual operation of said operating ring on the basis of a difference between the drive position command of said optical member, and an actually driven position.

14. A device according to claim 12, wherein the drive command is to command a drive velocity of said optical member, and said control means detects manual operation of said operating ring on the basis of a difference between the drive velocity command of said optical member, and an actually driven velocity.

15. A device according to claim 12, wherein the drive command of said optical member is input from operation means operated by a user.

16. A device according to claim 12, wherein the drive command of said optical member is input from a control unit located at a position separated from said optical device.

17. A device according to claim 12, wherein the drive command of said optical member is input from an image sensing device which is mounted on said optical device to be able to communicate therewith, and senses an image.

18. An image sensing system comprising:

an optical member;

an operating ring which can be rotated about an optical axis of said optical member and is capable of driving said optical member;

a switching mechanism which can transmit a drive force from a motor drive source to said operating ring, and can be switched between a state for motor-driving said optical member and a state for canceling motor driving of said optical member;

control means configured to switch switching said switching mechanism between the state for motor-driving said optical member and the state for canceling motor driving of said optical member on the basis of manual operation of said operating ring when said switching mechanism is set in the state for motor-driving said optical member; and an image sensing device which is mounted on the optical device to be able to communicate therewith, and senses an image;

wherein said control means detects manual operation of said operating ring on the basis of a difference between a drive state of said optical member corresponding to a drive command, and an actually driven state of said optical member.

* * * * *